United States Patent [19]

Muller et al.

[11] 4,172,189

[45] Oct. 23, 1979

[54] COMPOSITIONS OF SULFOCHLORINATED POLYOLEFINS WITH TITANIUM COMPOUNDS

[75] Inventors: Dieter Muller, Nurtingen; Dieter Barfurth, Lohmar; Heinz Nestler, Troisdorf-Eschmar, all of Fed. Rep. of Germany

[73] Assignee: Dynamit Nobel Aktiengesellschaft, Troisdorf, Fed. Rep. of Germany

[21] Appl. No.: 821,124

[22] Filed: Aug. 2, 1977

[30] Foreign Application Priority Data

Aug. 5, 1976 [DE] Fed. Rep. of Germany ....... 2635176

[51] Int. Cl.² .................... C08J 3/24; C08J 5/18; C08F 8/00
[52] U.S. Cl. .................. 525/330; 260/31.2 R; 260/32.8 A; 260/33.6 PQ; 260/33.8 UA; 260/42.34; 525/370
[58] Field of Search ...... 260/42.34, 79.3 R, 79.3 MU; 526/41, 47, 48.1

[56] References Cited

U.S. PATENT DOCUMENTS

| | | | |
|---|---|---|---|
| 3,226,356 | 12/1965 | Kehr | 260/79.3 R |
| 3,405,204 | 10/1968 | McCormack | 260/79.3 R |

*Primary Examiner*—C. A. Henderson
*Attorney, Agent, or Firm*—Sprung, Felfe, Horn, Lynch & Kramer

[57] ABSTRACT

A hardenable molding composition containing a sulfochlorinated polyolefin or sulfochlorinated olefin copolymer and a crosslinking agent, said crosslinking agent being an organic derivative or mixture of organic derivatives of titanic acid, e.g., the reaction product of a titanic acid ester with a chelating agent such as a β-dicarbonyl compound, an acetic acid ester or a polyhydroxy compound. Molding compositions of the invention can contain conventional additives, fillers, solvents, plasticizers, flameproofing agents, thixotropic agents and/or adhesivizing agents and the like.

21 Claims, No Drawings

COMPOSITIONS OF SULFOCHLORINATED POLYOLEFINS WITH TITANIUM COMPOUNDS

BACKGROUND OF THE INVENTION

Field of the Invention

This invention relates to a hardenable molding composition based upon sulfochlorinated polyolefins or sulfochlorinated polyolefin copolymers. More especially, this invention relates to a crosslinking agent for hardenable sulfochlorinated polyolefin or sulfochlorinated polyolefin copolymers. More especially, this invention relates to a cold-hardenable molding composition containing a sulfochlorinated polyolefin or sulfochlorinated polyolefin copolymer, the composition containing, if desired, conventional additives, fillers, organic solvents, flameproofing agents, thixotropic agents and/or adhesivizing agents.

DISCUSSION OF THE PRIOR ART

Sulforchlorinated polyethylene (HYPALON ®) is distinguished by great reactivity, and is susceptible of a number of different crosslinking reactions. Most of the cross-linking systems known hitherto have three components:

(a) a reactive metal oxide
(b) an organic acid
(c) an organic vulcanization accelerator.

Lead(II) oxide, magnesium oxide, or also tribasic lead maleate are used as the metal oxides. Resin acids are added preferentially as the acid component. Typical rubber vulcanization accelerators are used as accelerators. In order to use this system to achieve economical crosslinking times, the application of elevated temperature is necessary (usually more than 150° C.).

A system also commonly used today for the crosslinking of sulfochlorinated polyethylene uses epoxy resins as crosslinking agents and likewise vulcanization accelerators. Here again, however, the application of elevated temperature is necessary for the attainment of short hardening times.

The known crosslinking systems for the crosslinking of sulfochlorinated polyolefins are generally unsatisfactory in practice. For example, a crosslinking system containing tribasic lead maleate, hydrated colophony and an accelerator (mercaptobenzothiazole) does react at room temperature, too, but several hours are required for the formation of a skin and a number of months for complete hardening. Other systems, such as mixtures of benzaldimine and cyclohexylketimine, react satisfactorily, yet the incorporation of these substances involves considerable technical difficulty, since they decompose and become inactive in the presence of the slightest amounts of moisture.

It is an object of this invention, therefore, to provide a crosslinking system for sulfochlorinated polyolefins and sulfochlorinated polyolefin copolymers which can be hardened at room temperature. More especially, it is an object of this invention to provide such a crosslinking system which forms a skin upon the surface upon contact with atmospheric moisture in a relatively short period of time and hardens completely within a reasonable period thereafter. More especially, it is an object of this invention to provide a composition which forms an elastic skin virtually immediately upon contact with atmospheric moisture to protect the balance of the mass within about 20 to 25 minutes following contact with atmospheric moisture whereby to protect the interior components of the mass, which mass hardens completely within a matter of days, say, within about eight days.

The preferred object of the invention consists in making the outstanding properties of the sulfochlorinated polyolefins, especially sulfochlorinated polyethylene, particularly their weather resistance, usable for a single-component sealing or caulking composition or coating composition. For this purpose a crosslinking system had to be found which would make it possible to keep this composition in cartridges or containers without the occurrence of hardening before the end of six months or an entire year. On the other hand, this composition must form an elastic skin immediately upon the access of atmospheric moisture, to protect the rest of the mass within about 20 to 25 minutes against external influences, until hardening has taken place after a period of, for example, six to eight days, depending on the thickness of the layer. The use of elevated temperatures is undesirable in the preferred application in the building and housepainting sectors, i.e., the above-specified reaction times are to be achieved at ordinary temperatures.

SUMMARY OF THE INVENTION

In accordance with this invention there is provided an improved hardenable composition containing a sulfochlorinated polyolefin or sulfochlorinated polyolefin copolymer wherein the improvement resides in employing as a crosslinking agent for such sulfochlorinated polyolefin containing polymer an organic derivative or a mixture of derivatives of titanic acid. Crosslinking agents in accordance with the present invention include those derived from titanic acid esters by reaction of the same with a chelating agent, especially a $\beta$-dicarbonyl compound, an ester of acetic acid or a polyhydroxy compound.

The titanic acid esters used in accordance with the invention are titanium alcoholates and phenolates, which contain tetravalent titanium, and the corresponding titanium compounds in which the oxygen atoms linked to the titanium atom are wholly or partially replaced by sulfur atoms.

The titanium compounds are thus derived, for example, from primary, secondary or tertiary aliphatic alcohols and thioalcohols, especially alkanols, of up to 18 carbon atoms, which, if desired, can additionally contain oxygen or sulfur bridges in the aliphatic hydrocarbon moieties. Also suitable are titanium compounds which are derived from cycloaliphatic alcohols or from arylalkyl alcohols, the analogous thioalcohols again being included. Furthermore, those titanium compounds are also usable as crosslinking agents, in accordance with the invention, which are derived from phenols or thiophenols containing, if desired, alkyl groups, e.g., $C_1$ to $C_{12}$ on the aromatic ring, or from a number of different compounds, e.g., from aliphatic and aromatic compounds, containing hydroxyl groups. Lastly, the corresponding condensation products of the titanium compounds enumerated above, which are formed by the removal of alcohol or thioalcohol, or phenol or thiophenol (in the presence of water) can be used as crosslinking agents in accordance with the invention.

The titanic acid esters used according to the invention correspond to the general formulae

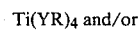

Ti(YR)$_4$ and/or

Ti(YR)$_3$-(Y-Ti(YR)$_2$)$_n$-Y-Ti(YR)$_3$ in which Y represents oxygen or sulfur, n a number between 0 and 20, preferably between 0 and 10, and R represents in each case an identical moiety or a plurality of different moieties of the group cycloalkyl, arylalkyl, alkylaryl, aryl, or preferably branched or unbranched alkyl moieties of 1 to 18 carbon atoms, preferably of 3 or 4 carbon atoms, having, if desired, one oxygen or sulfur atom between two carbon atoms. The titanic acid esters can be used singly or in a mixture. Where R represents a cycloalkyl group, the cycloalkyl group preferably contains between 5 and 8 carbocylic carbon atoms. Where R represents an aralkyl group, the aralkyl group preferably contains between 6 and 14 carbocyclic carbon atoms in the aryl portion and between 1 and 12 carbon atoms in the alkyl portion. Where R represents an alkylaryl group, there are preferably between 1 and 12 carbon atoms in the alkyl portion and between 6 and 14 in the aryl portion. Where R represents an aryl group, the aryl group preferably contains between 6 and 14 carbocyclic carbon atoms.

The following compounds are mentioned as examples: titanic acid tetramethyl and tetraethyl ester, titanic acid tetrapropyl ester, titanic acid tetraisopropyl ester, titanic acid tetra-n-butyl ester, titanic acid tetrakis-[2-methylpropyl ester], titanic acid tetra-n-butyl ester, titanic acid tetra-tert.-butyl ester, titanic acid tetra-n-pentyl ester, titanic acid tetra-n-hexyl ester, titanic acid tetra-n-octyl ester, titanic acid tetrakis-[2-ethylhexyl ester], titanic acid tetralauryl ester, titanic acid tetrastearyl ester, titanic acid tetraethyl and tetramethyl glycolate, titanic acid tetra-n-thiopropyl ester, titanium tetraphenolate and tetrathiophenolate, titanium tetracyclopentylate, titanium tetracyclohexylate, isopropylpolytitanate and n-butylpolytitanate.

The preparation of the titanic acid esters can be performed, for example, as described in "Ullmans Eyclcopaedie der technischen Chemie", Vol. 17, 1966, pages 431 to 433.

Titanium acylates of the general formula (RO)$_3$TiOCOR or (RO)$_2$Ti(OCOR)$_2$ or RO Ti(OCOR)$_3$ as obtained by the reaction of organic acids with titanic acid esters and removal of the alcohol by distillation can also be used in accordance with the invention in addition to the above-named titanic acid esters. In these formulas, R has the same meaning as above.

In addition to or instead of the above-named titanic acid esters and/or titanium acylates, titanium chelates can be used as crosslinking agents in accordance with the invention, as obtained by the reaction of orthotitanic acid esters of the general formula Ti(OR)$_4$ or a corresponding polymeric titanic acid ester with a chelating agent or a mixture of chelating agents and, in some cases, removal, by distillation, of the alcohol or phenol that forms, R having the same meaning as above.

Preferably, in the preparation of the chelates or chelate mixtures, one sets out from orthotitanic acid esters of low aliphatic monovalent alcohols, e.g., alkanols, of up to 5 carbon atoms, especially propyl or isopropyl or n-butyl or isobutyl titanate.

The titanium chelates used as crosslinking agents in accordance with the invention can also be prepared by the reaction of orthotitanic acid ester mixtures with one or more chelating agents, or, for example, by the reaction of an orthotitanic acid ester with a mixture of chelating agents.

As chelating agents, β-dicarbonyl compounds are used, such as acetyl acetone and/or diacetone alcohol and/or acetic acid esters, e.g., acetic acid alkyl esters of 1 to 12 carbon atoms in the ester group, such as acetic acid ethyl ester, for example, and/or polyhydroxy compounds, preferably di- or tri-hydroxy compounds. Preferably the polyhydroxy compounds have up to 24 C atoms, preferably 6 to 9 C atoms. They can be aliphatic or aromatic but are preferably aliphatic. Polyhydroxy compounds in the form of carbohydrates can also be employed.

Polyhydroxy compounds are, for example, glycerine, trimethylol propane, pentaerythritol, sorbitol, glucose, saccharose, alkanolamines such as diethanolamine or diisopropanolamine, N-methyldiethanolamine or triethanolamine or triisopropylamine or glycols, such as ethylene glycol, diethylene glycol, propanediol-1,3, butanediol-1,4, or glycols in which one OH group is linked to a primary carbon atom and the other OH group is linked to a secondary or tertiary carbon atom. Examples are 1,3-diols with 2 to 3 alkyl substituents, such as 2,2,4-trimethylpentanediol-1,3, 2-methylpentanediol-2,4, 2-ethylhexanediol-1,3, 2-methylpentanediol-1,3 and 2-methyl-5-propylheptanediol-1,3.

The polyhydroxy compounds can be used individually or in mixture as chelating agents, or also in mixture with at least one β-dicarbonyl compound.

The preparation of the titanium chelates used in accordance with the invention as crosslinking agents is accomplished simply by the reaction of the titanic acid esters of low monovalent alcohols with 1 to 4 moles of the chelating agents or chelating agent mixtures per mole of titanic acid ester, at elevated temperature if desired, e.g., 60 to 150° C., and, preferably, with the subsequent removal of the liberated monovalent alcohol by distillation.

The molding compositions of the invention are used preferably as sealing or caulking compositions or coating or puttying compositions, preferably in the construction industry, as for example, in the puttying or glazing of windows or caulking of seams and the like.

The crosslinking agents used in the invention are especially well suited for the making of single-component compositions which can be used as sealing or caulking or coating or puttying compositions in those cases in which cold setting, i.e., hardening without external heat input, is desired.

Such single-component compositions must satisfy special requirements. They are to be able to be stored for comparatively long periods in cartridges or other closed containers without hardening. On the other hand, such compositions, when applied to the material to be coated or sealed, must form an elastic skin at the ambient temperature as quickly as possible, e.g., in a period of 20 to 25 minutes, to protect the rest of the composition against external influences. For many applications, as for example in the caulking of seams in buildings or in the glazing of windows, it is desired that the complete setting of the entire composition take place in a period of, for example, about 1 to about 10 days eithout external heat input.

With the present invention, molding compositions are made available which are adaptable to existing practical requirements with regard to special characteristics, such as shelf life, skinning, full hardening, crosslinking temperature and the like, the cold-hardening single-component mixtures being especially notable since they comply in an outstanding manner with the requirements made of them. By the term "single-component mixtures", as used herein, those molding compositions are to be understood which are made available to the user by the manufacturer in ready-to-use form, i.e., with the necessary content of crosslinking agent.

The use of organic derivatives or mixtures of derivatives of titanic acid requires, as a rule, no additional crosslinking agents such as, for example, metal oxides such as MgO and PbO, or organic acids such as resin acids like hydrated colophony, fatty acids such as stearic acid or lauric acid, or vulcanization accelerators such as mercaptobenzothiazole, tetramethylthiuramidisulfide, di-o-tolylgunaidine, or ethylene thiourea, as is the case in comparable systems of the prior art. Nevertheless, the concomitant use of such known adjuvants in the molding compositions of the invention is fundamentally not to be excluded. The action of heat can also be eliminated as a rule, especially in the case of those molding compositions of the invention which are especially designed as single-component mixtures for applications in which the full hardening must, for practical or economic reasons, take place without the further input of heat. Moisture alone serves as the starter for the hardening of the molding compositions of the invention, the atmospheric humidity being generally sufficient.

Sulfochlorinated polyolefins or olefin copolymers having chlorine contents of 25 to 50% by weight and sulfur contents of 0.5 to 3% by weight are preferably used as the component to be crosslinked in the molding compositions of the invention. Especially suitable as polymer component in cold setting single-component mixtures are those having chlorine contents between 30 and 40 weight percent and having sulfur contents of 0.75 to 1.25 weight percent, preferably sulfochlorinated polyethylene.

If desired, a part (up to 20 weight percent for example) of the sulfochlorinated component can be replaced by another elastomer, e.g., natural rubber, butadiene-styrene rubber, neoprene, butyl rubber and/or nitrile rubber.

Cold-setting single-component mixtures which are designed as caulking, coating or glazing compositions contain preferably plasticizers, such as chlorinated paraffins, for example those containing 40 to 60 weight percent of chlorine, e.g., Witaclor ® 40. The amount of plasticizer will depend on the desired consistency of the mixture for application. As a rule, the amounts of plasticizer vary from 50 weight percent to 380 weight percent, with respect to the sulfochlorinated polymer component.

For the achievement of special properties, such as, for example, electrical characteristics, thermal stability, weather resistance, flow characteristics, improved adhesion and the like, the molding compositions can be modified with conventional additives, such as fillers and/or heat stabilizers and/or flameproofing agents and/or thixotropic agents and/or adhesivizers. Generally, the conventional additives, fillers, heat stabilizers, flameproofing and/or thixotropic agents and/or adhesivizers are present in a combined amount of up to 50 weight percent, preferably 15 to 25 weight percent.

The molding compositions of the invention can also contain organic solvents which are advantageous as transport media for the titanium compounds of the invention. It is desirable to use those solvents in which the sulfochlorinated component is soluble or swellable. Preferred are esters of acetic acid such as butyl acetate, and/or ketones such as methylisobutyl ketone, and/or aromatic hydrocarbons such as toluene, for example.

The incorporation of the additives including the crosslinking agent used in accordance with the invention is performed, for example, by placing first the sulfochlorinated component, with an adhesivizing additive if used, in a mixer, such as a planetary mixer or a Z-kneader, then adding the plasticizers and fillers, and finally the crosslinking component of the invention dissolved in a solvent of the above-specified kind, and mixing them thoroughly together. If desired, the working chamber of the mixer is evacuated at the end of the mixing process. The input or removal of heat during the mixing process is generally unnecessary.

The amount of crosslinking agent to be used is generally governed by the desired degree of crosslinking of the sulfochlorinated component used. As a rule, the crosslinking agents are used in amounts of 2 to 50 weight percent, preferably 15 to 35 weight percent, with respect to the sulfochlorinated component.

The preparation of the sulfochlorinated polyolefins or sulfochlorinated olefin copolymers, such as sulfochlorinated polyethylene or sulfochlorinated propylene or mixtures thereof or sulfochlorinated olefin copolymers, such as ethylene-propylene copolymers, can be performed as described in Ullmann's "Encyclopaedie der technischen Chemie", 3rd edition, pp. 342 et seq. Preferably, commercial types of HYPALON are used as the sulfochlorinated component, such as those described in "Plaste und Kautschuk", Vol. 14, No. 4, 1967, pp. 242 to 247.

A precise adaptation of hardening of a mixture containing a sulfochlorinated polyolefin or olefin copolymer or consisting thereof to the required conditions can be accomplished by the use of more or less reactive hydrolyzable organic derivatives or mixtures of derivatives of titanic acid. By the addition of triethanolamine titanate (Example 2), a good crosslinking is achieved in a shorter time than in the case of the use of butyl titanate, although the shelf life of such a composition for use as a cold-setting single-component caulking or coating composition will not be entirely satisfactory.

An adaptation of the molding compositions to the particular requirements can be achieved, for example, by mixing together organic derivatives of titanic acid having different activity.

Cold-setting single-component compositions of very good shelf life are obtained by using mixed chelates of a titanic acid ester, preferably of an o-titanic acid ester, as the crosslinking agent. Mixtures of alkanolamine and β-dicarbonyl compounds are used as chelating agents, for example, in the preparation of such mixed chelates. Preferred alkanolamines are triethanolamine, and/or N-methyldiethanolamine.

A particularly good shelf life (ability to retain fluidity in the closed vessel) is achieved with titanium chelates in whose preparation amounts of chelating agents have been used which during the chelation produce the splitting off, in the form of alcohol, of all alkoxy groups in the titanic acid ester in the form of alcohol. Suitable for this purpose are all those chelating agent mixtures in which the total number of reactive OH groups is equal to the alkoxy group number of the tianic acid ester. A suitable reaction mixture is, for example, a mixture of one mole of triethanolamine (3 reactive OH groups), one mole of acetic acid ethyl ester (1 reactive OH group) and one mole of isopropyltitanate (4 alkoxy groups).

In order to more fully illustrate the instant invention and the manner of practicing the same, the following Examples are presented:

EXAMPLES

Example 1

A mixture of
100 weight-parts of sulfochlorinated polyethylene (Hypalon ® 40, Type LD 999),
250 weight-parts of chlorinated paraffin (Witaclor ® 40)
10 weight-parts of Staybelite ® Ester
75 weight-parts of titanium dioxide
40 weight-parts of Bentone ® as thixotropic agent, and
100 weight-parts of 20% n-butylorthotitanate solution in butyl acetate
was homogenized as described above in a laboratory kneader. In the closed vessel, the composition maintains its fluidity for more than 30 days at 20° C. When it was spread on a sheet of glass (applied thickness about 5 mm), a skin formed after a short time; 24 hours later, this skin had lost much of its stickiness.

Full hardening takes 10 to 14 days.

Example 2

The following mixture was homogenized as in Example 1:
100 weight-parts of sulfochlorinated polyethylene (same as Example 1)
250 weight-parts of plasticizer (same as Example 1)
10 weight-parts of Staybelite ® ester as adhesion resin (same as Example 1)
75 weight-parts of titanium dioxide
40 weight-parts of Bentone ®
100 weight-parts of 20% triethanolamine titanate solution in butyl acetate.

In the closed vessel, the composition loses fluidity after 24 hours. When it was spread on a glass sheet (in a thickness of about 5 mm), it skinned over immediately. 24 hours Later this skin was no longer very sticky. Full hardening takes 3 to 4 days.

Example 3a (Preparation of a Special Titanium Chelate)

A mixture of 1 mole of triethanolamine and 1 mole of acetic acid ethyl ester was added, with stirring, to 1 mole of isopropyl titanate, the mixture warming up to about 80° C. After the addition of the amount of butyl acetate required for a 20% solution, 4 moles of isopropyl alcohol was distilled out of the mixture. The solution thus obtained was used in the following Example 3b.

Example 3b

The following mixture was homogenized as in Example 1:
100 weight-parts of sulfochlorinated polyethylene (same as Example 1)
250 weight-parts of plasticizer (same as in Example 1)
10 weight-parts of adhesive resin (same as in Example 1)
75 weight-parts of titanium dioxide
40 weight-parts of Bentone ®
100 weight-parts of 20% titanium chelate solution as in Example 3a.

In the closed container, the composition remained fluid for more than 30 days at 20° C. When it was spread on a glass sheet (layer thickness about 5 mm), it formed a skin in 20 to 25 minutes; this skin was elastic and was non-sticky after 24 hours. Full hardening takes 6 to 8 days.

BENTONE is identified as alkylamino-modified Montmorillonit, Trademark: Titangesellschaft
STAYBELITE is identified as hydrogenated wood rosin, Trademark: Hercules Powder

What is claimed is:

1. A hardenable molding composition comprising a sulfochlorinated polyolefin or sulfochlorinated olefin copolymer and a crosslinking agent, said crosslinking agent being a titanium acid ester, a titanium acylate or a titanium chelate, which titanium chelate is the reaction product of a titanic acid ester with a chelating agent or a mixture of chelating agents.

2. A hardenable molding composition according to claim 1 wherein the crosslinking agent is a titanic acid ester of the formula $Ti(YR)_4$ or $TI(YR)_3$-Y-$Ti(YR)_{2n}$-Y-$Ti(YR)_3$ wherein Y represents oxygen or sulfur, n represents a number between 0 and 20 and R in each case independently represents a cycloalkyl, aralkyl, alkylaryl, aryl or alkyl group which can contain oxygen or sulfur in the chain.

3. A hardenable molding composition according to claim 2 wherein the crosslinking agent is a titanium chelate.

4. A hardenable molding composition according to claim 3 wherein the chelating agent is a $\beta$-dicarbonyl compound, an acetic acid ester or a polyhydroxy compound.

5. A hardenable molding composition according to claim 4 wherein the chelating agent is an alkanolamine or an acetic acid ester.

6. A hardenable molding composition according to claim 5 wherein the chelating agent is an alkanolamine selected from the group consisting of triethanolamine and N-methyldiethanolamine.

7. A hardenable molding composition according to claim 4 wherein the chelating agent is acetyl acetone.

8. A hardenable molding composition according to claim 4 wherein the chelating agent is an acetic acid ester.

9. A hardenable molding composition according to claim 1 wherein said crosslinking agent is a titanium chelate obtained by reaction of a titanic acid ester with sufficient chelating agent to effect splitting off of all alkoxy groups of the titanic acid ester.

10. A hardenable molding composition according to claim 1 wherein the crosslinking agent is present in an amount of 2 to 50 weight percent based upon the weight of sulfochlorinated polyolefin or sulfochlorinated olefin copolymer.

11. A hardenable molding composition according to claim 10 wherein the crosslinking agent is present in an amount of 15 to 25 weight percent based upon the weight of the sulfochlorinated polyolefin or sulfochlorinated olefin copolymer.

12. A hardenable molding composition according to claim 1 wherein the crosslinking agent consists essentially of said titanium acid ester, titanium acylate or titanium chelate.

13. A hardenable molding composition according to claim 1 containing a filler, organic solvent, plasticizer, flameproofing agent, thixotropic agent, and/or adhesivizing agent.

14. A hardenable molding composition according to claim 13 containing a plasticizer, said plasticizer being present therein in an amount of 50 to 380 weight percent, based upon the weight of the sulfochlorinated polymer.

15. A composition according to claim 1 wherein said crosslinking agent is present in an amount of 2 to 50 weight percent based upon the weight of sulfochlorinated polyolefin or sulfochlorinated olefin copolymer.

16. A hardenable molding composition according to claim 13 wherein the organic solvent is butyl acetate, methylisobutylketone, or toluene.

17. A hardenable molding composition consisting essentially of a sulfochlorinated polyolefin or sulfochlorinated olefin copolymer and a crosslinking agent, said crosslinking agent being a titanium acid ester, titanium acylate or titanium chelate, which titanium chelate is the reaction product of a titanic acid ester with a chelating agent or a mixture of chelating agents.

18. A hardenable molding composition according to claim 2 wherein R in each case independently represents a cycloalkyl, aralkyl, alkylaryl, aryl or alkyl group of 1 to 18 carbon atoms.

19. A composition according to claim 18 wherein when R represents a cycloalkyl group it contains between 5 and 8 carbocyclic carbon atoms, when R represents an aralkyl group the aralkyl group preferably contains between 6 and 14 carbocyclic carbon atoms in the aryl portion and between 1 and 12 carbon atoms in the alkyl portion, when R represents alkylaryl it contains between 1 and 12 carbon atoms in the alkyl portion and between 6 and 14 carbon atoms in the aryl portion and when R represents an aryl group the aryl group contains between 6 and 14 carbocyclic carbon atoms.

20. A composition according to claim 1 wherein said crosslinking agent is a titanium acylate of the formula (RO)$_3$TiOCOR; (RO)$_2$Ti(OCOR)$_2$ or ROTi(OCOR)$_3$ where R represents in each case an identical moiety or a plurality of different moieties of the group cycloalkyl, arylalkyl, alkylaryl, aryl or alkyl of 1 to 18 carbon atoms.

21. A composition according to claim 17 wherein the crosslinking agent is present in an amount of 2 to 50 weight percent based upon the weight of sulfochlorinated polyolefin or sulfochlorinated olefin copolymer.

* * * * *